(12) United States Patent
Martin et al.

(10) Patent No.: US 7,147,681 B1
(45) Date of Patent: Dec. 12, 2006

(54) METHOD AND DEVICE FOR REMOVING RECOVERABLE WASTE PRODUCTS AND NON-RECOVERABLE WASTE PRODUCTS

(76) Inventors: Harald Martin, Fliederweg 61, D-06567 Bad Frankenhausen (DE); Hartwig Streitenberger, Kunitzer Strasse 26, D-07751 Golmsdorf (DE)

( * ) Notice: Subject to any disclaimer, the term of this patent is extended or adjusted under 35 U.S.C. 154(b) by 454 days.

(21) Appl. No.: 10/030,177

(22) PCT Filed: Aug. 2, 2000

(86) PCT No.: PCT/DE00/02659

§ 371 (c)(1),
(2), (4) Date: Mar. 11, 2002

(87) PCT Pub. No.: WO01/09267

PCT Pub. Date: Feb. 8, 2001

(30) Foreign Application Priority Data

Aug. 3, 1999 (DE) ................ 199 37 524

(51) Int. Cl.
*C01B 3/02* (2006.01)
*C01B 3/24* (2006.01)
(52) U.S. Cl. .............. 48/198.3; 422/210; 422/211; 201/21; 201/27
(58) Field of Classification Search ............. 422/146, 422/184.1, 210; 201/21, 27; 202/133, 136, 202/137, 247; 48/122, 198.3
See application file for complete search history.

(56) References Cited

U.S. PATENT DOCUMENTS

| 1,972,929 | A |   | 9/1934  | Fisher          |         |
|-----------|---|---|---------|-----------------|---------|
| 4,123,332 | A | * | 10/1978 | Rotter          | 201/15  |
| 4,412,560 | A | * | 11/1983 | Broodman        | 138/143 |
| 4,412,889 | A |   | 11/1983 | Oeck            |         |
| 4,501,644 | A |   | 2/1985  | Thomas          |         |
| 4,881,947 | A | * | 11/1989 | Parker et al.   | 48/89   |
| 5,425,317 | A |   | 6/1995  | Schaub et al.   |         |
| 5,425,792 | A | * | 6/1995  | Bishop et al.   | 48/197 R|
| 5,439,491 | A | * | 8/1995  | Kubiak et al.   | 48/99   |
| 5,584,969 | A | * | 12/1996 | Nagai et al.    | 196/116 |
| 5,656,044 | A | * | 8/1997  | Bishop et al.   | 48/197 R|
| 5,851,246 | A | * | 12/1998 | Bishop et al.   | 48/122  |
| 6,067,915 | A | * | 5/2000  | Sharpe          | 110/346 |
| 6,178,899 | B1| * | 1/2001  | Kaneko et al.   | 110/346 |
| 6,648,932 | B1| * | 11/2003 | Maton           | 48/119  |

FOREIGN PATENT DOCUMENTS

| DE | 2546801  | 4/1977  |
| DE | 2816282  | 10/1979 |
| DE | 3417620  | 11/1985 |
| DE | 3632105  | 4/1987  |
| DE | 3826520  | 2/1990  |
| DE | 4139512  | 6/1993  |
| DE | 4226632  | 7/1993  |
| DE | 4209549  | 9/1993  |
| DE | 4230311  | 12/1993 |
| DE | 4235412  | 4/1994  |
| DE | 4237161  | 5/1994  |
| DE | 4337421  | 1/1995  |
| DE | 4334544  | 4/1995  |
| DE | 19528018 | 2/1997  |
| DE | 4441423  | 6/1997  |
| DE | 19612037 | 10/1997 |
| DE | 19714593 | 10/1998 |
| EP |  280364  | 8/1988  |
| EP | 0280364  | 8/1988  |
| EP | 0426925  | 5/1991  |
| EP | 0609802  | 8/1994  |
| FR |  426925  | 5/1991  |
| WO | 94/18287 | 8/1994  |
| WO | 99/04197 | 1/1999  |
| WO | 00/17288 | 3/2000  |
| WO | 01/08823 | 2/2001  |

* cited by examiner

*Primary Examiner*—N. Bhat
(74) *Attorney, Agent, or Firm*—Greenblum & Bernstein, P.L.C.

(57) ABSTRACT

Method and apparatus used in the field of waste management for utilizing recoverable waste products as efficiently as possible. The invention reduces the environmental impact of such a method to a minimum. The recoverable waste products and non-recoverable waste products are fed into one end of a substantially horizontally fixed container as material, and are transported in a continuous or discontinuous manner to another end of the container, 60–80% of energy input being carried out on the material in an area of a first quarter of the container, and a remaining 20–40% of energy input being transferred to the material in other areas of the container.

32 Claims, No Drawings

METHOD AND DEVICE FOR REMOVING RECOVERABLE WASTE PRODUCTS AND NON-RECOVERABLE WASTE PRODUCTS

TECHNICAL FIELD

The invention relates to the fields of the paper industry, waste management and mechanical engineering and concerns a method and device for removing recoverable waste products and non-recoverable waste products, in particular non-recoverable waste products that occur in the paper industry and are to be utilized as efficiently as possible.

DISCUSSION OF BACKGROUND INFORMATION

In the processing of recovered paper in the recycling process, residual matter remains after the elutriation of the mechanical desludging. This residual substances can contain, in varying amounts, concentration and type, clumped paper, cardboard remnants, plastic pieces, wood residues, metal parts, and more besides. As a whole, these residual substances are called rejects. After exiting the elutriation process and, if necessary, after intermediate deposition during which a gravimetric dewatering can occur, these rejects are, in general, deposited at a hazardous waste landfill.

At this point, these rejects contain an average of 50% water, which can occur as surface water and also as water absorbed in the paper and wood portion.

Various methods and devices are already known or have been described which include the utilization and, in particular, the thermal treatment of waste, residual substances and rejects.

A method for the thermal recovery of non-recoverable waste products is known from DE 41 39 512 A1. In this case, the non-recoverable waste products are household refuse, industrial waste containing plastics, paint residue, scrap tires, shredder light material from the recycling of scrap cars, or waste contaminated with oils. According to this method, these non-recoverable waste products are subjected without costly pretreatments to a combination of known processing stages, such as pyrolysis, crushing, classification, gasification and gas cleaning. This method is intended on the one hand to produce a clean gas suitable for versatile material and energy uses, and on the other to yield elutriation-proof, useable or easy to dump purely mineral, solid residue, while at the same time ruling out toxic impact on the environment.

Furthermore, according to DE 44 41 423 a method and device are known that are used to extract useable gas from waste by means of pyrolysis. With this method, the crushed waste is loaded in a pyrolysis drum sealed gas-tight, in which the pyrolysis gas is produced and the pyrolysis residue is separated. The pyrolysis gas is split into a cracked gas in a gas transformer with the addition of air and in the presence of a red-hot coke bed. The heat necessary for pyrolysis is transferred by a gas in direct contact with the material to be pyrolyzed. A partial stream of this gas is the cracked gas leaving the gas transformer.

A method for utilizing a starting material is also known from DE 43 34 544. With this method the starting material of polymer or other packing material with or without residual content that can be carbonized or not or pyrolyzed or not, is loaded in a reaction chamber. In this reaction chamber the components that can be carbonized are carbonized and the components that can be pyrolyzed are pyrolyzed, the gases produced being used as energy sources for a firing and the residual substances being taken out for further treatment.

According to DE 42 09 549 a method is known for the thermal treatment of residual substances, e.g. for the separation and recovery of metal compounds with organic content by means of a combination of pyrolysis and gasification. According to this method, the residual substances are separated in a gas and a solid phase and decomposed by means of pyrolysis at 300 to 700° C. Existing, usable products are separated from the solid phase and the remaining materials, together with the gas phase, are gasified to fuel gas with oxygen-enriched air or oxygen at temperatures>1300° C.

Furthermore, a method is known from DE 36 32 105 for removing fissile contaminants from a pyrolysis gas. Accordingly, the pyrolysis gas, which was produced by the pyrolysis of a material containing carbon and/or hydrocarbon, is fed into a reaction chamber together with a gas heated in a plasma generator, and there the contaminants are split off so that the gas can now be supplied directly to the consumer.

According to DE 38 26 520 A1, a method is also known for the pyrolysis of sewage sludge in an externally heated, fixed reactor with an internally located transport apparatus, in which the pyrolysis, as a controllable process separate in terms of time and location, is carried out in several stages of drying, heating to decomposition temperature, pyrolysis in several temperature ranges and recovery of the pyrolysis residue as fuel.

The first stage here is dewatering the sewage sludge, the second stage is heating the dried product to 200–250° C., the third stage is the thermal decomposition of the sewage sludge to pyrolysis gases and a carbonaceous residue at 251 to 700° C., preferably at 300–500° C., and the fourth stage is the combustion of the pyrolysis gases produced and the application of the hot gas to heat the reactor in separate heating zones according to stages 1, 2 and 3.

Furthermore, a method and a device are known from DE 34 17 620 that are used to produce thermal energy that can be converted into mechanical energy from the incineration of wet waste. The invention assumes that the moisture in wet waste must be removed before it can be incinerated. A heat source for drying the waste here can be the steam that vaporizes from the wet waste, or the other heat source is the flue gas from the incineration plant. The device for implementing this invention comprises a waste drying apparatus with a feed screw, a continually agitating dryer, a second feed screw, a closed and insulated conveyor, an air supply chamber, an air supply plant with a blower and three air preheaters and a thermal energy supply plant for the dryer with a pressurizing apparatus and a supply unit.

A device for treating materials containing aluminum is furthermore known from DE 42 37 161 A1. This device comprises an indirectly heated rotary kiln with a conveyor arranged inside a gas-tight revolving cylinder, two sluices and a feed hopper and a wire shaking apparatus. The conveyor inside the gas-tight revolving cylinder is a conveyor screw that is used to circulate the product treated.

Furthermore, a plant is known from DE 195 28 018 A1 for the thermal treatment of materials with organic components, in which a revolving cylinder is arranged essentially concentrically around a shaft and connected to it, inside a housing that can be filled with hot gas.

According to DE 43 37 421 A1 a multistage, high-temperature incineration of waste products with inert components and a device for carrying out this process are known. In a first stage at first an hypostoichiometric incineration and in the second stage a further incineration is carried out in a closed chamber.

Maintaining high safety standards is disadvantageous with all of these methods and devices, since the processing stages applied, in particular pyrolysis and gasification, have to be carried out in part with the exclusion of air and at high temperatures.

SUMMARY OF THE INVENTION

The object of the invention is to achieve as completely as possible the removal of recoverable waste products and non-recoverable waste products, using a device that is simpler to use and easier to regulate, while reducing the environmental impact to a minimum.

The present invention is directed to a method for removing recoverable waste products and non-recoverable waste products, comprising feeding recoverable waste products and non-recoverable waste products into one end of a substantially horizontally fixed container as material, continuously or discontinuously transporting the material to another end of the container, 60–80% of energy input being carried out on the material in an area of a first quarter of the container based upon the one end of the container into which the material is fed, and a remaining 20–40% of energy input being transferred to the material in other areas of the container, discharging an entire exhaust gas-solids mixture from the container, and subsequently subjecting the exhaust gases and the solids to an energy recovery process.

The present invention is also directed to apparatus for removing recoverable waste products and non-recoverable waste products, comprising a tubular container with a feed opening for recoverable and non-recoverable waste products as material on one end, a discharge opening for the exhaust gas-solids mixture on another end, a shaft arranged centrally through the container, devices positioned on the shaft, and at least one of a device for cracking hydrocarbons and a device for gasification of solids from the container positioned after the discharge opening of the container.

The materials fed to the container can comprise a residual moisture of 10%.

The material can be transported continuously at a speed of 18 m/h to a discharge opening.

The energy input on the material of 70% can be carried out in the first quarter of the container. Each further quarter of the container subsequent to the first quarter can include an energy input of 10%. The energy input in the first quarter can be carried out by a burner. The energy input in the other areas of the container can be carried out by heated air. The energy input can be carried out at least in the first quarter directly on the material.

A maximum temperature of 600–700° C. can be implemented in the container to start the process.

The discharged exhaust gas-solids mixture can be fed into a device for cracking long-chain hydrocarbons after the container.

After being discharged from the container the exhaust gas-solids mixture or after cracking of long-chain hydrocarbons in a further process, the exhaust gas-solids mixture can be conveyed to a device for gasification of energy components. The gasification can be carried out with hypostoichiometric air supply. The gasification can be regulated via a partial combustion process. Steam can be added to the gasification process. The tubular container can be composed of sheet metal in a double-walled construction.

The feed opening can be arranged as a stuffing screw with a gate valve in an upper front area of the container.

A burner can be arranged in a lower front area of the container. The shaft can be tubular.

The devices positioned on the shaft can comprise devices to transport the material. The devices positioned on the shaft can be paddles. The paddles can comprise pitched surfaces. The devices positioned on the shaft can be attached to the shaft with keyed joints. The shaft can be located outside the container.

Grates to collect the material can be arranged over an entire length of the container in a lower area.

A blade-like device can be arranged at the discharge opening of the container for discharging the exhaust gas-solids mixture.

A device for cracking long-chain hydrocarbons and a device for the gasification of the exhaust gas-solids mixture can be positioned after the container, and can comprise one device.

The tubular container can comprise an ignition source in an area of the discharge opening. The ignition source can be a burner with an open flame or a spiral-wound filament.

The tubular container can comprise a pressure release opening in an upper part in an area of the discharge opening. The pressure release opening can be a flap or a weighted safety valve.

The solution according to the invention makes it possible to reclaim recoverable waste products and non-recoverable waste products almost completely in an environmentally friendly way, thereby producing energy that can be used in part for maintaining the process according to the invention. However, it can also be used for other energy-intensive processes.

The operating principle of the device according to the invention, using the method according to the invention, is as follows.

Recoverable and non-recoverable waste products from the most varied fields, e.g. from the paper industry (rejects) or from the leather industry, or household waste or hazardous waste are brought in. These products and materials are very inhomogeneous, made up of the most varied inorganic and organic materials, and often compacted together or compressed. For this reason it is necessary to separate these products and materials. This can be carried out by devices known per se in the form of shredders, rippers or choppers.

After separating the products and materials, a selection is carried out. This selection focuses in particular on separating metallic from nonmetallic materials. All metallic materials can be fed to another reclamation.

The recoverable and non-recoverable waste products thus processed are then conveyed to a device for preheating and/or drying.

The separated and selected and, if necessary, preheated and/or dried material is fed into the tubular container on one of its sides via a feed opening.

A shaft extends through the middle of the fixed container, which can be cooled or insulated. Devices are located on this shaft for transporting and loosening and mixing the material in the container. By means of the devices on the shaft, the material in the container is transported continuously or discontinuously in the direction of the discharge opening. The devices on the shaft are advantageously paddles featuring pitched surfaces. These paddles are likewise advantageously attached to the shaft by form-closed keyed joints. This means they can be easily exchanged.

The shaft is advantageously embodied in tubular form and located on each face of the container on the outside.

In the lower area, grates are arranged in the container over its entire length, on which the material is deposited and transported forwards in the direction of the discharge opening. These grates render possible the input of energy through the inflow of heated air from below. While the material is in the container it is charged with energy and thereby pyrolyzed and gasified. The energy input takes place in the start-up process through the direct insertion and impingement of the material with heated air and after the onset of gasification by the partial combustion of the gases produced. The energy input is thereby qualitatively divided. Between 60 and 80% of the energy input is applied to the material in approx. the first quarter of the container. The remaining 20 to 40% of the energy is applied in the remaining three quarters of the container. The energy input takes place via heated air directly on the material.

At the start of the process a kind of hot bed of red-hot, thermally decomposed recoverable and non-recoverable waste products is produced in this area of the container through the supply of energy, which bed is repeatedly fed by the subsequently delivered, preheated material. A maximum temperature of 600–700° C. is thereby achieved in the container. This hot bed is likewise transported further in the direction of the discharge opening and subsequently discharged through the sluice-like discharge opening. These solid decomposition products are of a coke-like nature.

The burning heat in this hot bed is maintained by the subsequent supply of material to be decomposed and by the addition of oxygen or air, e.g., an oxygen-containing gas. A device for the regulated addition of air or oxygen for thermal decomposition is located under the hot bed, advantageously over the entire length of the area.

Through the controlled and regulated feeding of air or oxygen into the area of the thermal decomposition, a controllable thermal decomposition is achieved that can be regulated very precisely in terms of temperature control by means of the amount of air or oxygen added. The more air or oxygen is added, the higher the temperature in the area of the thermal decomposition of the container.

According to the invention, thermal decomposition is a controlled process between pyrolysis and incineration of the supplied material.

However, according to the invention a complete incineration of the supplied material does not occur, since air or oxygen is always added to the process only in hypostoichiometric amounts and the oxygen released in any case is combusted by the open flame arranged in the area.

It is thereby possible to have to conduct the process under not absolutely gas-tight conditions, which leads to a considerably more cost-effective device. The safety requirements are thereby no longer as high, either.

After the start of the process, thermal decomposition occurs with the release of energy.

In the area of the thermal decomposition in the container, regulable temperatures of up to 900° C. are produced and maintained. Advantageously, temperatures are set between 400 and 800° C.

In addition to the solid decomposition products comprising mainly carbon, a crude gas with a temperature of 700–800° C. is also produced with thermal decomposition. These are extracted from the container through the discharge opening as an exhaust gas-solids mixture and fed through ducts to a device for cracking the long-chain hydrocarbons and/or a device for the gasification of the solids. In this way the exhaust gases and solids from the container are processed for energy recovery.

An ignition source is advantageously installed in the tubular container in the area of the discharge opening. This ignition source can be a burner with an open flame or a spiral-wound filament. They are used to burn up any oxygen possibly still existing before the discharge of the exhaust gas-solids mixture from the container.

Furthermore, a pressure release opening is advantageously installed in the upper area of the tubular container in the area of the discharge opening. This opens when an excess pressure is reached in the tubular container, which, however, does not occur in carrying out the method according to the invention. In the case of breakdowns or damage, the possible occurrence of such an excess pressure in the tubular container can thus be reduced. This pressure release opening can be embodied as a flap or as a weighted safety valve.

BEST WAY OF IMPLEMENTING THE INVENTION

The invention is described in greater detail below on the basis of an exemplary embodiment.

A cylindrical, fixed container with the dimensions: length 8000 mm, interior diameter 1600 mm, features a feed opening in the upper left area, through which opening the preheated material is transported into the container. The container further features a burner opening in the lower left part. A shaft with paddles extends through the center of the container inside over the entire length of the container. This tubular shaft with paddles is powered by a motor that is installed outside the container.

An inlet for heated air is arranged in the lower area of the container over its entire length. The discharge opening serves to draw off the entire exhaust gas-solids mixture arriving at the end of the container.

Recoverable and non-recoverable waste products from the paper industry are used which feature the following composition.

Paper and cardboard remnants, clumped, 1.0 to 3.0 cm edge length,

Wood pieces, mechanically broken up, partially fibrous surface, 0.5 to 5 cm edge length, PE foil and plastic remnants, partially in clumps, up to 10 $cm^2$, Rubber pieces, as strips and cords, wound, 0.5 to 3.0 cm, Fabric remnants, fiberized as pieces, 1 $cm^2$ to 5 $cm^2$, Ferrous metal, as wire pieces, sheet-metal strips and in crushed form shredded, 0.5 to 3 mm edge length or diameter, Aluminum foil, as pieces or crushed to 2 cm diameter crushed, Tin plate, beverage cans, crushed.

The gross weight of these products and materials amounts to approx. 0.35 $kg/dm^3$.

The water content amounts to approx. 40%.

These products and materials are separated by spiked rollers. The flow rate is 5 t/h. Subsequently, the separated material is treated with a magnet and the selected metal parts removed. Afterwards the material is transported via a conveyor system to a drying tower, where it is heated to approx. 80° C. and the water is removed. The length of time in the drying tower is approx. 1.5 h.

Afterwards the dried material is continuously conveyed into the container via conveyer belts and the feed opening, which is embodied as a stuffing screw with a gate valve in the upper left part of the container. In the container, the material is moved by the shaft with paddles in the direction of the discharge opening with a rotational speed of 5–7 revolutions/min. The remaining moisture is thus removed.

An inlet for heated air is located in the lower area of the feed opening under the grates in the container. A burner is positioned in the feed segment which heats the arriving air to the necessary temperature of 600° C. By the direct impingement of the heated air on the intake material in the first quarter, a hot bed is produced that is fed by the following material and the heat in the maintained by the heated air (3.2 m$^3$/h) and by the beginning partial combustion of the gases produced. The fed material is thermally decomposed and the solid decomposition products in the form of 95–98% crystalline carbon, so-called pyrolysis coke, are discharged through the discharge opening together with the exhaust gas and conveyed to a further energy recovery process.

After the start of the process, temperatures of approx. 700° C. prevail in the area of thermal decomposition. To start the process, the temperature is produced by the inflow of heated air. Afterwards the energy continues to be fed through heated air and through the starting partial combustion of the gases produced. The heated air flows from below through the grate to the material and maintains the necessary temperature in the hotbed up to the discharge opening.

The exhaust gas-solids mixture produced is conveyed after the container via ducts to a device for cracking the long-chain hydrocarbons and from there transferred to a device for the gasification of the solids. The materials thus subjected to a further energy recovery process can be used as heating gas for other thermal processes. The residual solid has 90% mineral components and can be disposed of as ash.

What is claimed is:

1. A method for removing recoverable waste products and non-recoverable waste products, comprising feeding recoverable waste products and non-recoverable waste products into one end of a substantially horizontally fixed container as material, continuously or discontinuously transporting the material to another end of the container, supplying a controlled amount of an oxygen-containing gas to the container, 60–80% of energy input being carried out on the material in an area of a first quarter of the container based upon the one end of the container into which the material is fed, and a remaining 20–40% of energy input being transferred to the material in other areas of the container, discharging an entire exhaust gas-solids mixture from the container, and subsequently subjecting the exhaust gases and the solids to an energy recovery process.

2. The method according to claim 1, wherein the materials fed to the container comprise a residual moisture of 10%.

3. The method according to claim 1, wherein the material is transported continuously at a speed of 18 m/h to a discharge opening.

4. The method according to claim 1, wherein an energy input on the material of 70% is carried out in the first quarter of the container.

5. The method according to claim 1, wherein each further quarter of the container subsequent to the first quarter includes an energy input of 10%.

6. The method according to claim 1, wherein energy input in the first quarter is carried out by a burner.

7. The method according to claim 1, wherein the energy input in the other areas of the container is carried out by heated air.

8. The method according to claim 1, wherein the energy input is carried out at least in the first quarter directly on the material.

9. The method according to claim 1 wherein a maximum temperature of 600–700° C. is implemented in the container to start the process.

10. The method according to claim 1, wherein the discharged exhaust gas-solids mixture is fed into a device for cracking long-chain hydrocarbons after the container.

11. The method according to claim 1, wherein after being discharged from the container the exhaust gas-solids mixture or after cracking of long-chain hydrocarbons in a further process, the exhaust gas-solids mixture is conveyed to a device for gasification of energy components.

12. The method according to claim 11, wherein the gasification is carried out with hypostoichiometric air supply.

13. The method according to claim 11, wherein the gasification is regulated via a partial combustion process.

14. The method according to claim 11, wherein steam is added to the gasification process.

15. An apparatus for removing recoverable waste products and non-recoverable waste products, comprising a tubular container with a feed opening for recoverable and non-recoverable waste products as material on one end, a discharge opening for the exhaust gas-solids mixture on another end, a shaft arranged centrally through the container, devices positioned on said shaft, an oxygen-containing gas supply to introduce a controlled supply of oxygen-containing gas into the container, and at least one of a device for cracking hydrocarbons and a device for gasification of solids from the container positioned after the discharge opening of the container.

16. The apparatus according to claim 15, wherein the tubular container is composed of sheet metal in a double-walled construction.

17. The apparatus according to claim 15, wherein the feed opening is arranged as a stuffing screw with a gate valve in an upper front area of the container.

18. The apparatus according to claim 15, wherein a burner is arranged in a lower front area of the container.

19. The apparatus according to claim 15, wherein the shaft is tubular.

20. The apparatus according to claim 15, wherein the devices positioned on the shaft comprise devices to transport the material.

21. The apparatus according to claim 20, wherein the devices positioned on the shaft are paddles.

22. The apparatus according to claim 20, wherein the paddles comprise pitched surfaces.

23. The apparatus according to claim 15, wherein the devices positioned on the shaft are attached to the shaft with keyed joints.

24. The apparatus according to claim 15, wherein the shaft is located outside the container.

25. The apparatus according to claim 15, wherein grates to collect the material are arranged over an entire length of the container in a lower area.

26. The apparatus according to claim 15, wherein a blade-like device is arranged at the discharge opening of the container for discharging the exhaust gas-solids mixture.

27. The apparatus according to claim 15, wherein a device for cracking long-chain hydrocarbons and a device for the gasification of the exhaust gas-solids mixture are positioned after the container.

28. The apparatus according to claim 27, wherein the device for cracking long-chain hydrocarbons and the device for the gasification of the exhaust gas-solids mixture comprise one device.

29. The apparatus according to claim 15, wherein the tubular container comprises an ignition source in an area of the discharge opening.

30. The apparatus according to claim 29, wherein the ignition source is a burner with an open flame or a spiral-wound filament.

31. The apparatus according to claim 15, wherein the tubular container comprises a pressure release opening in an upper part in an area of the discharge opening.

32. The apparatus according to claim 31, wherein the pressure release opening is a flap or a weighted safety valve.

* * * * *